US012591037B2

(12) United States Patent     (10) Patent No.: US 12,591,037 B2
Arumugam                          (45) Date of Patent:     Mar. 31, 2026

(54) QUANTUM RYDBERG RADARS

(71) Applicant: CALIFORNIA INSTITUTE OF TECHNOLOGY, Pasadena, CA (US)

(72) Inventor: Darmindra D. Arumugam, Pasadena, CA (US)

(73) Assignee: CALIFORNIA INSTITUTE OF TECHNOLOGY

( * ) Notice:   Subject to any disclaimer, the term of this patent is extended or adjusted under 35 U.S.C. 154(b) by 296 days.

(21) Appl. No.: 18/432,413

(22) Filed:   Feb. 5, 2024

(65)          Prior Publication Data

US 2024/0288534 A1     Aug. 29, 2024

Related U.S. Application Data

(60) Provisional application No. 63/443,482, filed on Feb. 6, 2023.

(51) Int. Cl.
   *G01S 7/03*      (2006.01)
   *G01S 13/48*     (2006.01)
   *G01S 13/00*     (2006.01)
(52) U.S. Cl.
   CPC .............. *G01S 7/032* (2013.01); *G01S 13/48* (2013.01); *G01S 13/003* (2013.01)

(58) Field of Classification Search
   None
   See application file for complete search history.

(56)              References Cited

U.S. PATENT DOCUMENTS

| | | | | |
|---|---|---|---|---|
| 11,674,991 B2 * | 6/2023 | Cox | .................. | G01R 29/0878 |
| | | | | 324/260 |
| 11,843,420 B1 * | 12/2023 | Caliga | .................... | H04B 10/70 |
| 11,885,904 B2 * | 1/2024 | Bohaichuk | .............. | G01S 7/285 |
| 12,273,149 B2 * | 4/2025 | Caliga | .................... | G06N 10/40 |
| 2018/0241408 A1 * | 8/2018 | Hayashi | ................... | H03L 7/26 |
| 2020/0233025 A1 * | 7/2020 | Salim | ................. | G01R 29/0885 |
| 2021/0250101 A1 * | 8/2021 | Gordon | ................. | H01Q 1/366 |
| 2021/0255228 A1 * | 8/2021 | Salim | .................... | G01R 33/60 |
| 2022/0228972 A1 * | 7/2022 | Nelson | .............. | H01S 3/094096 |
| 2022/0263585 A1 * | 8/2022 | Hamilton | .............. | H04B 10/70 |

* cited by examiner

*Primary Examiner* — Bernarr E Gregory
(74) *Attorney, Agent, or Firm* — Steinfl + Bruno LLP

(57)              ABSTRACT

Methods and receiving devices to detect radio frequency signals are disclosed. The described methods and devices make use of quantum Rydberg modes to detect direct signals, such as satellite signals, and indirect scattered signals, such as signals from constructions or individuals inside constructions. The incoming radio signals to the receiver are automatically down-converted for detection via electromagnetic induced transparency (EIT). The quantum Rydberg modes are obtained though optical excitation of alkali metal atoms.

20 Claims, 5 Drawing Sheets

QUANTUM RYDBERG RADARS

CROSS REFERENCE TO RELATED APPLICATIONS

The present application claims priority to U.S. Provisional Patent Application No. 63/443,482 filed on Feb. 6, 2023, incorporated herein by reference in its entirety.

STATEMENT OF GOVERNMENT GRANT

This invention was made with government support under Grant No. 8NMO0018D0004 awarded by the NASA (JPL). The government has certain rights in the invention.

FIELD

The present disclosure is related to quantum Rydberg radars, also called quantum atomic receivers or Rydberg state-based atomic receivers herein.

SUMMARY

According to a first aspect, a Rydberg state-based atomic receiver is provided, comprising: a detector configured to detect direct signals and indirect scattered signals, the detector including: a detection component including at least one vapor cell containing alkali metal atoms; and a signal processing component, coupled with the detection component, comprising a probing laser and a coupling laser, the probing and the coupling laser being configured to drive the alkali metal atoms of the at least one vapor cell to a Rydberg atomic state, to perform i) detection of the direct signals and indirect scattered signal and ii) correlation between the direct signals and the indirect scattered signals.

According to a second aspect, an aerial Rydberg state-based atomic receiver is provided, comprising: a container comprising alkali metal atoms; and a probing laser and a coupling laser coupled to the container and configured to drive the alkali metal atoms to a Rydberg atomic state, wherein the receiver is configured to: receive direct signals from a satellite network and receive indirect signals comprising a scattered signal field from a structure approachable through aerial movement of the receiver; detect the direct signals and the indirect signals when the alkali metal atoms are in the Rydberg atomic state; and perform a correlation between the direct signals and the indirect signals to obtain information related to the structure.

According to a third aspect, a wearable and moveable Rydberg state-based atomic receiver is provided, comprising: a portable unit comprising alkali metal atoms coupled to a probing laser and a coupling laser configured to drive the alkali metal atoms to a Rydberg atomic state, wherein the portable unit is configured to be worn by a moving user and to: receive direct signals from satellites and ground-based electromagnetic sources; receive indirect signals comprising a scattered signal field from an individual carrying an RF-signals emitting device inside a structure; detect the direct signals and the indirect signals when the alkali metal atoms are in the Rydberg atomic state; and perform a correlation between the direct signals and the indirect signals to obtain information related to the individual.

According to a fourth aspect, a static Rydberg state-based atomic receiver configured to be located on a ground-based structure is provided, comprising: a unit comprising alkali metal atoms coupled to a probing laser and a coupling laser configured to drive the alkali metal atoms to a Rydberg atomic state, wherein the portable unit is configured to be located on a static ground-based structure and to: receive direct signals from satellites and ground-based electromagnetic sources; receive indirect signals comprising a scattered signal field from an individual carrying an RF-signals emitting device inside a structure; detect the direct signals and the indirect signals when the alkali metal atoms are in the Rydberg atomic state; and perform a correlation between the direct signals and the indirect signals to obtain information related to the individual.

According to a fifth aspect, a method of detecting radio frequency (RF) signals comprising: optically exciting cesium or rubidium atoms to a Rydberg state to induce electromagnetic transparency in the cesium or rubidium atoms; coupling the cesium or rubidium atoms in the Rydberg state to an RF signal to be detected thus modulating the electromagnetic transparency or the cesium or rubidium atoms to obtain a modulated transparency; and optically converting the modulated transparency to obtain a down-converted signal for detection of the RF signal.

Further aspects of the disclosure are provided in the description, drawings and claims of the present application.

DETAILED DESCRIPTION

Rydberg radars are signal agnostic, highly sensitive, dynamically tunable, and ultra-broad band devices. Such devices are able, among other things, to remotely detect critical cryospheric processes like ice flow, ice shelf evolution, snow accumulation, and bedrock mapping, without the need for antennas, RF front-ends, or mixers.

As a signal-of-opportunity radar receiver, a Rydberg radar has flexibility to observe the dynamics and transients of multiple key cryospheric processes by using co-located multi-band navigation and communication signals. It can operate across six distinct radar bands spanning from VHF to Ku bands (e.g., 137 MHz, 255 MHz, 370 MHz, 1.2-2.2 GHz, 5.4-5.7 GHZ, 7-9.6 GHZ, 13.5 GHZ).

Radio reflectometry techniques leverage these signals of opportunity to study and quantify bedrock topography, snow water equivalent, ice sheet flow, snow accumulation rates, and precipitation.

The present disclosure describes quantum atomic receivers to detect weak radio frequency and radio signals. The described devices leverage radio reflectometry techniques to enable radar characterization of surfaces and sub-surfaces. Such devices may also use modulated data signals transmitted from various science, communication, and navigation satellites.

Orbital satellites (e.g. the network of GNSS satellites or other types of low-earth-orbit (LEO) satellites) generate strong signals, generally referred to as signals of opportunity. These signals cover a broad range of frequencies (up to about 24 GHZ) and can be used in order to perform remote sensing by receiving their field. Therefore, a compact device can be provided, that does not need signal generation capabilities and that can dynamically tune and provide a remote sensing readout over a broad spectrum frequency range.

Figure 1:
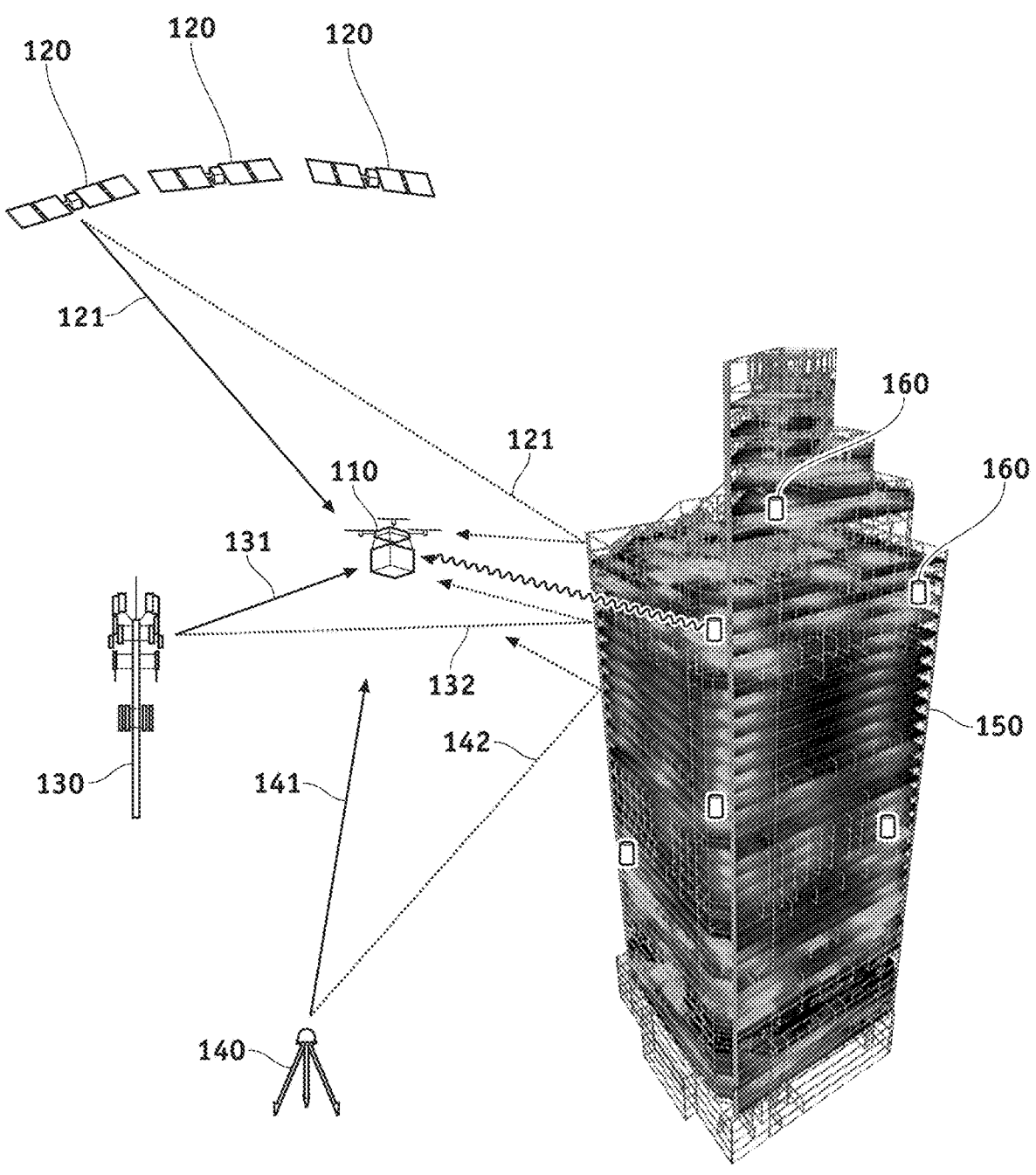
FIG. 1 shows a diagram of an embodiment of the present disclosure, where an atomic detector is implemented on a low-altitude drone to perform sensing of a nearby structure.

FIG. 1 shows a high-level diagram of an embodiment of the present disclosure, where the quantum atomic receiver (also called quantum Rydberg radar throughout the present disclosure) (110) is implemented on a low-altitude drone to perform sensing of a nearby structure, such as a building, constructions, or topography. In particular, the quantum atomic receiver (110) is configured to receive direct opportunistic signals (121) from a network or constellation of satellites (120), direct non-opportunistic signals (131, 141) from tower sources (130) and/or ground sources (140), and indirect signals (122, 132, 142) consisting of a scattered signal field coming from a building, construction or structure in general (150). In the embodiment of FIG. 1, structure (150) is shown including a plurality of wireless nodes (160). In order to provide sensing related to the structure (150), the quantum atomic receiver (110) performs a correlation between the direct and indirect signals to obtain raw electromagnetic transients that allow detection of the indirect signals.

As shown in FIG. 1, the quantum atomic receiver (110) is able to process not only signals of opportunity in the GHz range coming from satellite network (120), but also non-opportunistic signals, such as signals in the MHz or THz ranges, coming from sources (130, 140).

The ability of the quantum atomic receiver (110) to process signals in such a vast range of communication frequencies is due to its principle of operation in accordance with atomic Rydberg states, where atoms are optically sensitized (e.g. through lasers) to bring their electrons to their Rydberg level.

Figure 2:
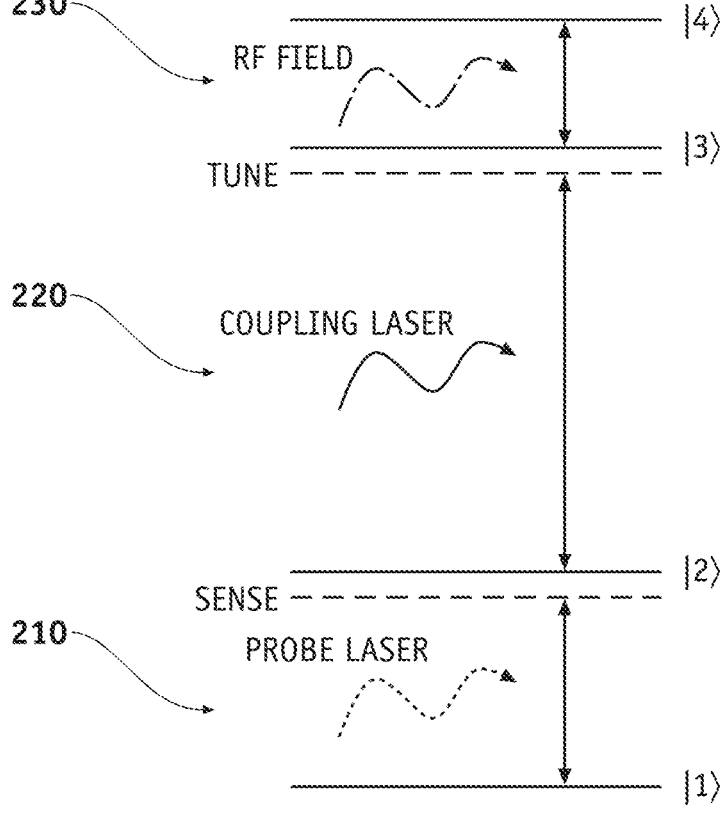
FIG. 2 shows a schematic representation of the coupling process of alkali metal vapor atoms to a Rydberg state.

Such principle of operation is illustrated in FIG. 2, which shows a conceptual example of a multi-level approach that uses Rydberg states.

In particular, Rydberg states are highly excited states (still lower than an ionization level) of the outer valence electron of an atom, where properties scale in terms of the principal quantum number, n. The quantum atomic receiver or detector according to the present disclosure typically uses alkali metal vapors (Li, Na, K, Rb, Cs, Fr, all with a single valence electron) at large n, thus being able to detect kHz to THz waves/fields. The preferred elements are Rb (rubidium) and Cs (caesium). In particular, Cs requires a lower n and a smaller radius wave function for detection, thus reducing atom-atom interactions.

Energy levels E of atoms scale as $n^{-2}$, while $\Delta E$ (energy difference between states) scales as $n^{-3}$. At high n, $\Delta E$ is in the 0.1-1000 GHz range. As a consequence, signals in this 100 MHz to 1 THz range can be absorbed by the Cs or Rb atom to push its electron to nearby states. This occurs through lasers allowing orbital transitions from the ground state to the excited states necessary to reach the Rydberg state.

As shown in the schematic representation of FIG. 2, a probe laser (210), usually in the 845-875 nm range (preferably 852 nm) excites room temperature alkali metal vapor atoms (usually encased in a vapor cell, not shown) from a ground state to a first excited state. A tunable coupling laser (220), usually in the 508-515 nm range (preferably 510 nm) further excites the alkali vapor atoms from that state up to a Rydberg state (thus allowing "coupling" to the Rydberg state), where the alkali vapor atoms are now sensitive to an RF field (230), due to the small value of $\Delta E$ noted above. Given the conceptual nature of this diagram, no additional components (e.g. optical components) are shown for simplicity. However, the person skilled in the art will appreciate that no RF or microwave components are needed to couple the atoms to the Rydberg state. Additionally, in terms of size, the dimensions of the quantum atomic detector will be comparable to the dimensions of the probe and coupling lasers used to couple to the Rydberg state. Therefore, the representation of FIG. 2 allows for a compact and broad spectrum design, which includes, in essence, a vapor cell, laser systems, and a signal processing circuitry.

While acting on the Rb or Cs atoms to reach an excited Rydberg state is a relevant component of the atomic detector of the present disclosure, another component is the readout circuitry that allows a signal field to be evaluated. This is obtained by using a photodetector with the same probe laser (210) as a means of readout through interaction of the RF field to be detected with part of the probe laser light through spectroscopy of the atom itself. Advantageously, even if the signal to be detected is a high-frequency signal, the readout occurs at baseband (e.g. a simple scope or low-cost spectrum analyzer), given that no RF or microwave components are necessary to reach the Rydberg state.

Figure 3:
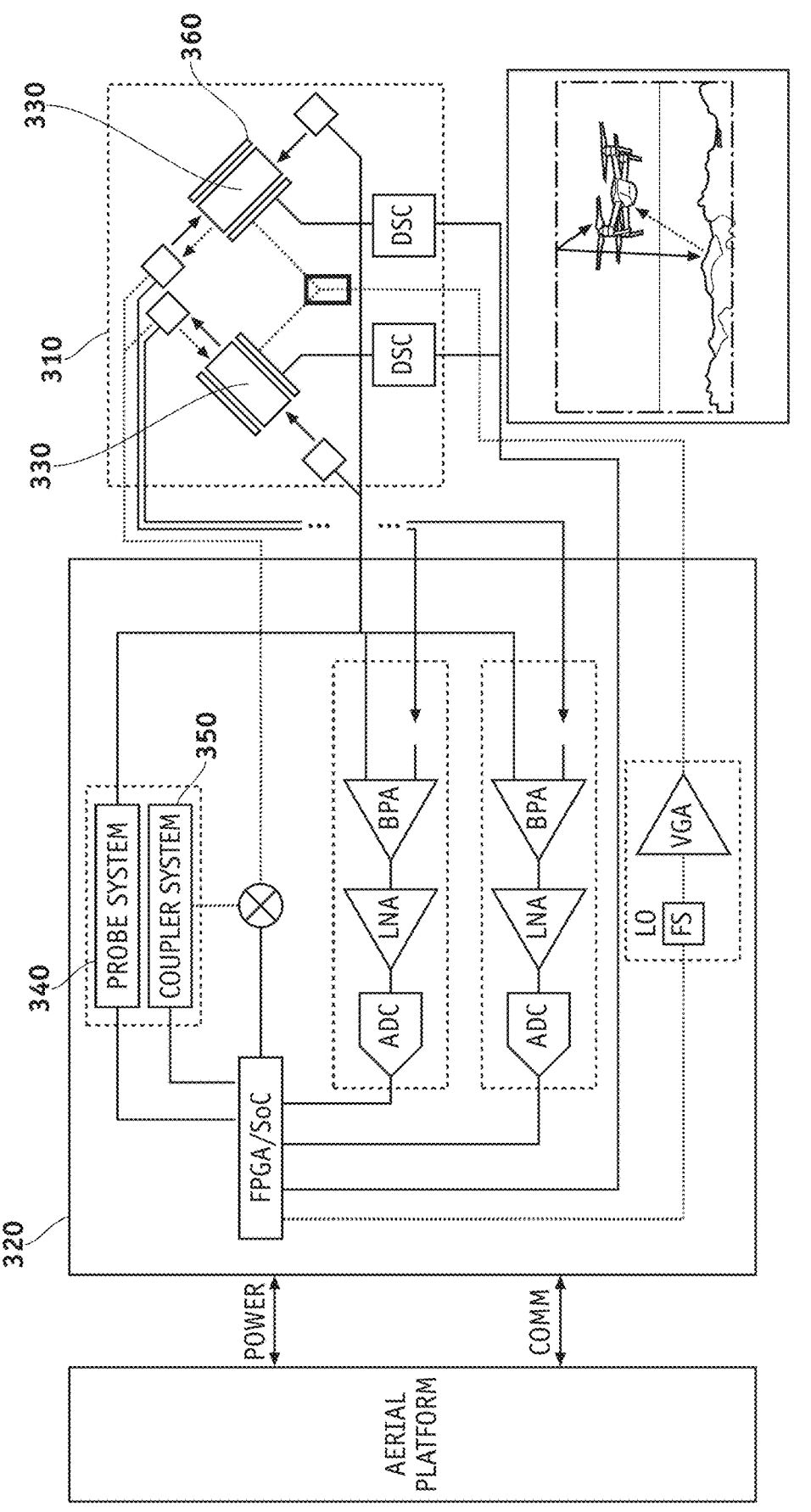
FIG. 3 shows a schematic structure of the atomic detector according to the present disclosure, where a dual polarization system is adopted.

Signals can be detected by the quantum atomic receiver both in Zenith and Nadir directions. By way of example, FIG. 3 shows an embodiment of the quantum atomic receiver according to the present disclosure where a dual polarization (e.g. 0 and 90 degree polarizations) system is adopted. In particular, a dedicated first (e.g. top-facing, Zenith) detector to detect direct signals from satellites, network sources or ground sources, and a dedicated second (e.g. bottom facing, Nadir) detector to detect indirect signals from buildings or constructions are provided. Zenith and Nadir directional receivers may be located on drones or satellites, for example. For ease of reference only one of such detectors is shown, inclusive of a detection component (310) and a signal processing component (320). By way of example, the detection component (310) is located on a first integrated circuit or chip, while the signal processing component (320) is located on a second integrated circuit or chip. Both components are connected to a serial platform configured for powering the detector (POWER) and transmission/reception of data (COMM).

The embodiment of FIG. 3 shows two vapor cells (330) for each detection component (310), where the same laser system inclusive of a probing laser system (340) and a coupling laser system (350), both located in the signal processing component (320), is used to drive both. The probing and coupling laser systems (340, 350) are configured to interact with the vapor cells (330) in accordance with the methodology previously described with reference to FIG. 2, where the probing laser system (340) along with a photodetector serves as a readout mechanism. RF control (or "dressing") of the optical signal of the laser systems occurs on parallel plates (360) around each vapor cell (330), through a local oscillator (LO) section operating as a tunable split ring resonator (SRR), which includes a frequency synthesizer (FS) and variable gain amplifier (VGA). The probing laser signal is compared with the processed probing laser signal, as processed through the vapor cells (330) to detect and determine the characteristics of the incoming RF signal. This processing includes the shown additional circuitry for dual polarization control, inclusive of band-pass amplifiers (BPA), low-noise amplifiers (LNA), analog-todigital converters (ADC) and a field programmable gate array (FPGA)/System-on-Chip (SoC).

With continued reference to FIG. 3, the incoming indirect signals are down converted to baseband/IF (intermediate frequency) via electromagnetic induced transparency (EIT). This quantum process occurs when the probe laser (340) signal is sampled by a photodetector. In other words, the probing laser beam and the coupler laser beam interact with the Rydberg atoms in the vapor cells, causing EIT. This makes the atoms transparent to a specific frequency. An incoming RF signal is coupled to the atoms using parallel plates (360) around the vapor cells. This RF signal modulates the transparency of the atoms. The resulting signal from the probing laser beam is used to read out the modulation after the probing laser beam passes through the vapor cell, since its transmission is affected by the transparency changes. The optical signal is detected by a photodiode. The resulting photodiode signal represents a down-converted version of the original RF signal, and thus the RF signal is detected. This is essentially enabled by the quantum EIT effects in the Rydberg atoms.

Figure 4:
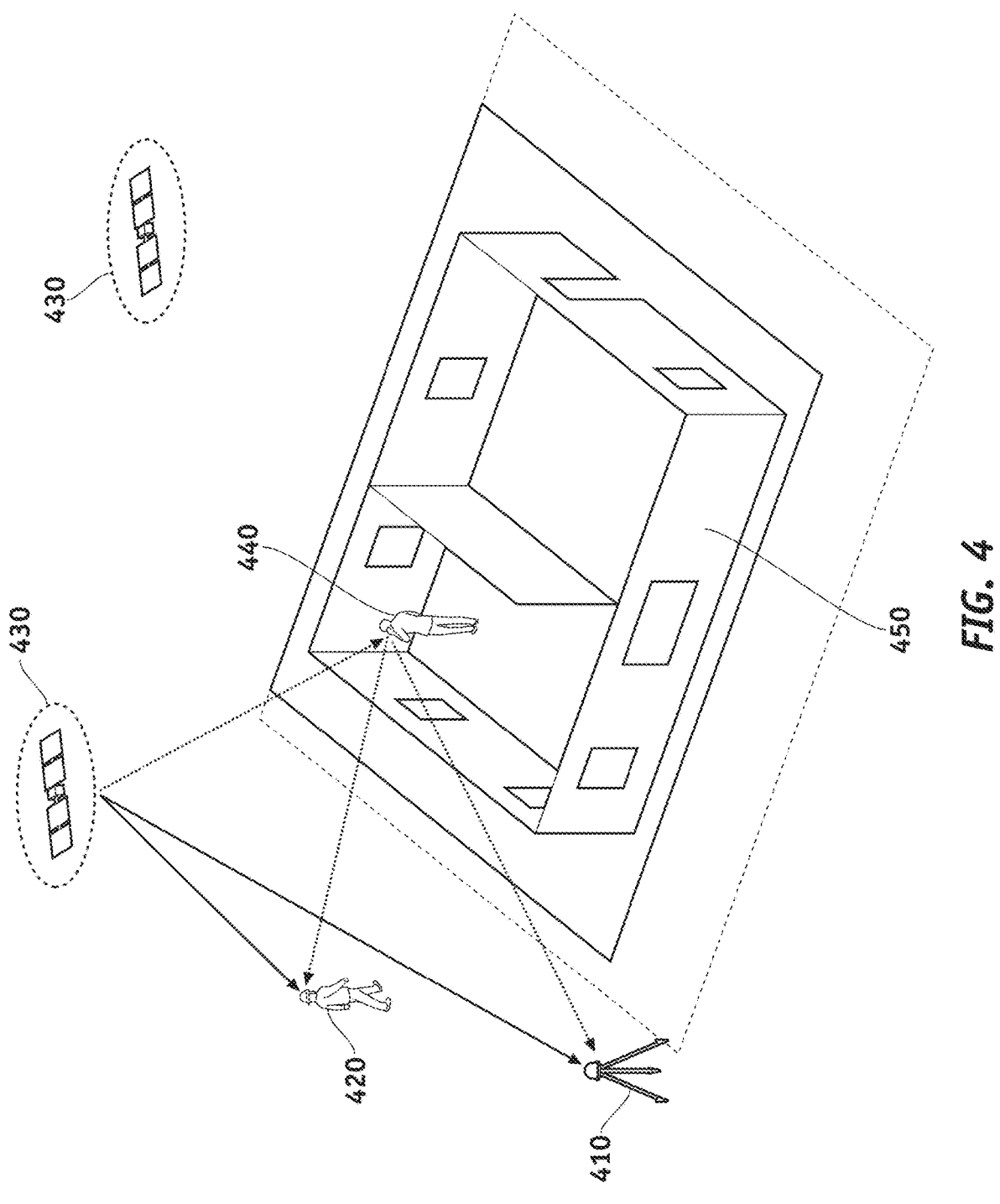
FIG. 4 shows an embodiment where retargeting to mobile or static ground nodes is provided.

FIG. 4 shows a further embodiment of the present disclosure where a retargeting technique to mobile or static ground nodes is described. In particular, the quantum atomic receiver can be located on a static observation ground station (410) acting as a deployed node, or a moving observatory (420) on ground, acting as a moving node. Both the station (410) and the observatory (420) receive direct signals and indirect signals. The direct signals can come from e.g. satellites (430) or cell/mobile signals from devices carried by a person (440), e.g. inside a building (450). The indirect signals can include a scattered field from the building (450).

As noted in the embodiment of FIG. 4, individuals moving in a building can be sensed by the quantum atomic receiver by applying correlation with direct signals coming from e.g. a satellite. This can be obtained, for example, through a numerical electromagnetic scattering simulation algorithm to evaluate the scattering behavior of the parameters involved. These parameters include: a) physical optics propagation parameters, taking into account reflection by the dielectric properties of the walls and ground; b) Fourier/Bessel functions for target/person scattering; c) Born approximation for perturbation theory of total field. The results are then used to investigate a spatial mode perturbation by the moving person. One such example is illustrated at page 7 of U.S. Prov. App. 63/443,482 filed on Feb. 6, 2023, incorporated herein by reference in its entirety.

In addition, with reference to the satellite signals, it should be noted that the spatial mode behavior of satellite signals is generally unique, due to their different properties and physics such as polarization, incidence angle, frequency and phase. Moreover, such signal penetrates through buildings in different ways, contributing to their uniqueness. For example, signals at or above GHz frequencies provide reverberation resonant modes and preferential penetration (walls vs. windows/cracks/openings). On the other hand, signals at frequencies below GHz provide more building level modes and greater bulk penetration. See also page 8 of U.S. Prov. App. No. 63/443,482.

Furthermore, more accurate evaluations can be provided by factoring in static and moving observations as follows: a) spatial-temporal mode behaviors are visualized as a function of a1) stating vs. moving observer and a2) static vs. moving target/person; b) spatial-temporal mode behaviors are observed in magnitude and phase. In this case, the phase response is best analyzed post auto-correlation with the satellite direct signals; and c) start of target moving time. See also page 9 of U.S. Prov. App. No. 63/443,482.

Fourier analysis of spatial-temporal modes can also be adopted. In particular, amplitude and phase Fourier domain analysis of the spatial-temporal mode allows discrimination of a moving observer vs. a target. Additionally, narrowband responses with strong SNR (signal-to-noise ratio) have shapes that are strongly correlated to motion characteristics. See also page 10 of U.S. Prov. App. No. 63/443,482.

Multi-spectral data analytics can also be applied, given that different satellites provide a unique coverage and sensitivity of a scene. In other words, each satellite of a network provides a different spatial mode coverage due to the varied incident angles. By way of example, different bands (e.g. P and C) provide different spatial-temporal mode behaviors that can be used to obtain broad-spectrum data analytics, such as: a) motional properties of the observer and target; and b) unique higher-order motional behavior, such as motion type and style. As a consequence, multi-spectral data allow coverage and sensitivity to motional behaviors, as well as enabling multi-individual characterization. See also page 10 of U.S. Prov. App. No. 63/443,482.

Figure 5:
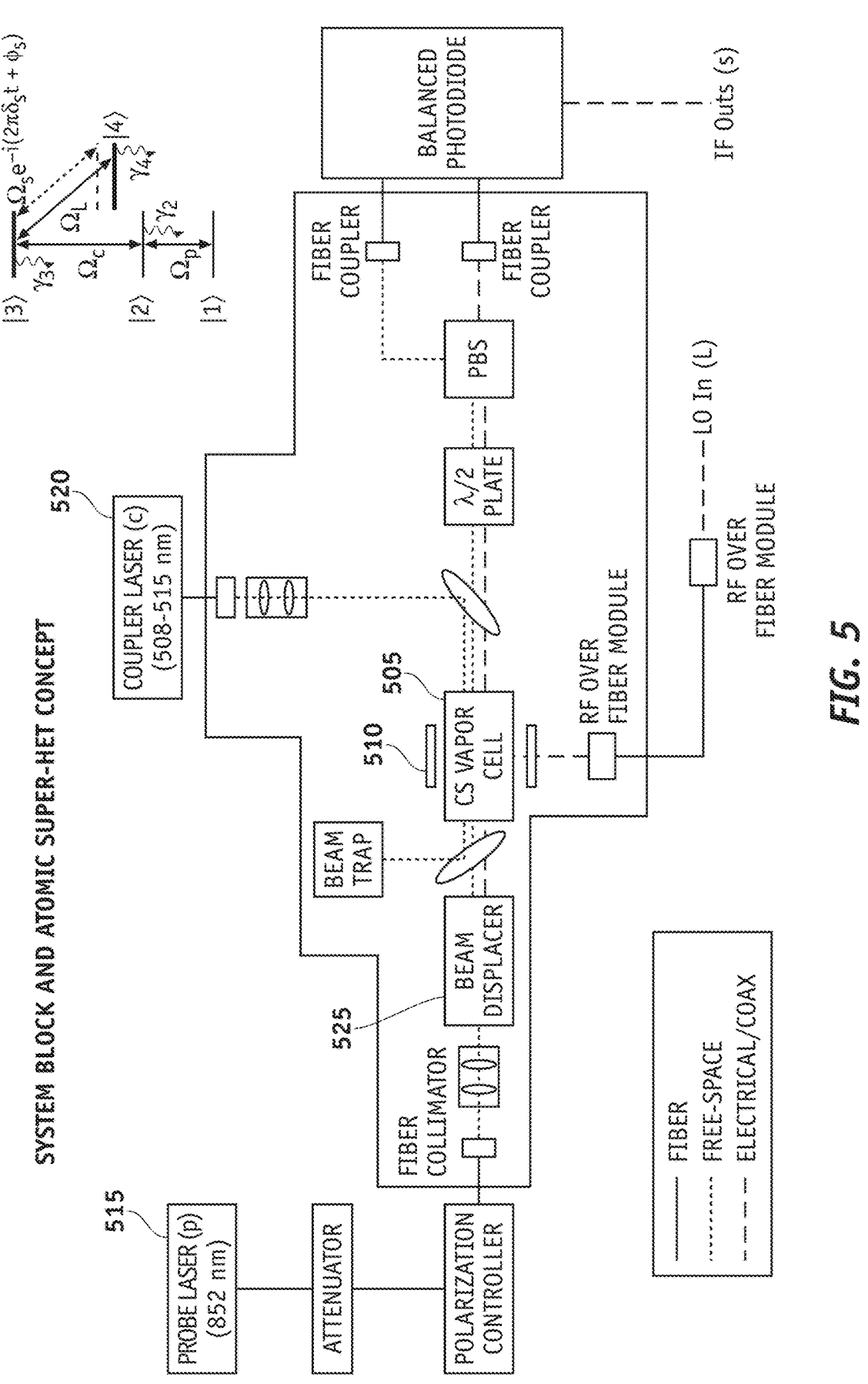
FIG. 5 shows an experimental setup of the quantum atomic receiver according to the present disclosure.

FIG. 5 shows an experimental setup of the quantum atomic receiver according to the present disclosure. A vapor cell (505) with RF dressing gain plates (510) (see also description of FIG. 3 above) is shown, together with probing laser (515) and coupling laser (520), where operation occurs according to a 4-stage super-heterodyning technique. A beam displacer (525) is also shown, to obtain two separate probing laser beams interacting with one coupling laser beam, where one of the two probing laser beams is used as a reference, to obtain a balanced detection.

Based on the above embodiments, the person skilled in the art will appreciate the several advantages obtained by the teachings of the present disclosure. In particular: a) the disclosed methods and devices are highly sensitive; b) the disclosed methods and devices essentially represent a dynamically tunable ultra-broad-band radar system using quantum Rydberg atomic sensing (10 kHz to 1 THz); and c) the disclosed devices do not require an antenna or RF components.

The disclosed methods and devices provide solutions that can process nearly all I- to K-band signals of opportunity visible from low Earth orbit. The disclosed devices offer the following additional advantages: a) they are signal agnostic, able to adapt to any transmitted signal; b) they can adapt on-the-fly to new signal types as they emerge; c) they enable improvements in spectral and temporal resolution compared to existing state-of-the-art systems.

The invention claimed is:

1. A Rydberg state-based atomic receiver, comprising:
a detector configured to detect direct signals and indirect scattered signals, the detector including:
a detection component including at least one vapor cell containing alkali metal atoms; and
a signal processing component, coupled with the detection component, comprising a probing laser and a coupling laser, the probing and the coupling laser being configured to drive the alkali metal atoms of the at least one vapor cell to a Rydberg atomic state, to perform i) detection of the direct signals and indirect scattered signal and ii) correlation between the direct signals and the indirect scattered signals.

2. The Rydberg state-based atomic receiver of claim 1, wherein the at least one vapor cell comprises a first vapor cell in correspondence of a first polarization and a second vapor cell in correspondence with a second polarization.

3. The Rydberg state-based atomic receiver of claim 1, wherein the at least one vapor cell is capable of detecting radio frequency (RF) signals.

4. The Rydberg state-based atomic receiver of claim 1, further comprising a photodetector configured to perform readout of the direct signals and indirect scattered signals after the alkali atoms of the at least one vapor cell are driven to the Rydberg atomic state.

5. The Rydberg state-based atomic receiver of claim 1, wherein the alkali metal atoms comprise rubidium atoms.

6. The Rydberg state-based atomic receiver of claim 1, wherein the alkali metal atoms comprise cesium atoms.

7. The Rydberg state-based atomic receiver of claim 1, wherein the detection component is located on a first integrated circuit and the signal processing component is located on a second integrated circuit separate from and coupled to the first integrated circuit.

8. The Rydberg state-based atomic receiver of claim 1, wherein the direct signals from satellites, network sources or ground sources.

9. The Rydberg state-based atomic receiver of claim 1, wherein the indirect scattered signals are reflections from buildings, constructions, or topography of direct signals from satellites, network sources, or ground sources.

10. A drone comprising a zenith detector and a nadir detector, the zenith detector and the nadir detector each comprising an aerial Rydberg state-base atomic receiver of claim 1.

11. The drone of claim 10, wherein the zenith detector is configured to detect direct signals and the nadir detector is configured to detect indirect signals.

12. An aerial Rydberg state-based atomic receiver comprising a container comprising alkali metal atoms; and a probing laser and a coupling laser coupled to the container and configured to drive the alkali metal atoms to a Rydberg atomic state, wherein the receiver is configured to:

receive direct signals from a satellite network and receive indirect signals comprising a scattered signal field from a structure approachable through aerial movement of the receiver;

detect the direct signals and the indirect signals when the alkali metal atoms are in the Rydberg atomic state; and perform a correlation between the direct signals and the indirect signals to obtain information related to the structure.

13. The aerial Rydberg state-base atomic receiver of claim 12, being implemented on a drone.

14. The aerial Rydberg state-base atomic receiver of claim 12, wherein detection of the direct signals and the indirect signals occurs through a readout performed by a photodetector.

15. The aerial Rydberg state-base atomic receiver of claim 12, wherein the direct signals from the satellite network comprise signals in a GHz range.

16. The aerial Rydberg state-base atomic receiver of claim 12, wherein the receiver is further configured to receive direct signals from tower sources or ground sources.

17. The aerial Rydberg state-base atomic receiver of claim 16, wherein the direct signals comprise signals in a MHz or THz range.

18. A wearable and moveable Rydberg state-based atomic receiver comprising a portable unit comprising alkali metal atoms coupled to a probing laser and a coupling laser configured to drive the alkali metal atoms to a Rydberg atomic state, wherein the portable unit is configured to be worn by a moving user and to:

receive direct signals from satellites and ground-based electromagnetic sources;

receive indirect signals comprising a scattered signal field from an individual carrying a radio frequency (RF) signals emitting device inside a structure;

detect the direct signals and the indirect signals when the alkali metal atoms are in the Rydberg atomic state; and perform a correlation between the direct signals and the indirect signals to obtain information related to the individual.

19. A static Rydberg state-based atomic receiver configured to be located on a ground-based structure, comprising:

a unit comprising alkali metal atoms coupled to a probing laser and a coupling laser configured to drive the alkali metal atoms to a Rydberg atomic state, wherein the portable unit is configured to be located on a static ground-based structure and to:

receive direct signals from satellites and ground-based electromagnetic sources;

receive indirect signals comprising a scattered signal field from an individual carrying a radio frequency (RF) signals emitting device inside a structure;

detect the direct signals and the indirect signals when the alkali metal atoms are in the Rydberg atomic state; and perform a correlation between the direct signals and the indirect signals to obtain information related to the individual.

20. A method of detecting radio frequency (RF) signals comprising:

optically exciting cesium or rubidium atoms to a Rydberg state to induce electromagnetic transparency in the cesium or rubidium atoms;

coupling the cesium or rubidium atoms in the Rydberg state to an RF signal to be detected thus modulating the electromagnetic transparency of the cesium or rubidium atoms to obtain a modulated transparency; and optically converting the modulated transparency to obtain a down-converted signal for detection of the RF signal.

\* \* \* \* \*